United States Patent [19]

Peterson

[11] Patent Number: 4,551,189
[45] Date of Patent: Nov. 5, 1985

[54] FRICTION WELDED FASTENER SYSTEM

[75] Inventor: Francis C. Peterson, Woodbury, Conn.

[73] Assignee: Illinois Tool Works Inc., Chicago, Ill.

[21] Appl. No.: 681,040

[22] Filed: Dec. 12, 1984

[51] Int. Cl.⁴ .............................................. B29C 27/08
[52] U.S. Cl. ................................ 156/73.5; 24/90 HA; 156/580; 264/68
[58] Field of Search ................. 156/73.5, 580; 264/68; 24/90 HA

[56] References Cited

U.S. PATENT DOCUMENTS

| | | | |
|---|---|---|---|
| 2,470,963 | 5/1949 | Weyl | 24/90 HA |
| 3,438,825 | 4/1969 | Fidler | 156/73.5 |
| 3,580,793 | 5/1971 | Hewitt | 156/73.5 |
| 4,250,596 | 2/1981 | Hara et al. | 24/90 HA |
| 4,477,307 | 10/1984 | Cearlock et al. | 156/73.5 |

Primary Examiner—Michael Wityshyn
Attorney, Agent, or Firm—John P. O'Brien; Thomas W. Buckman

[57] ABSTRACT

A friction welding fastener system is disclosed for fusing a thermoplastic material fastener to a substrate by heat of friction induced through the application of rotative and axial forces applied to the fastener. A cavity is formed inwardly of the bottom surface of the thermoplastic base member and a heat activated adhesive material having a bonding affinity for both the base material and the substrate material is inserted into the cavity to form a layer having a thickness equal or greater than the thickness of the base member. The base member is rotated with sufficient rotative and axial forces to cause the heat activated adhesive layer to adhere to the substrate.

3 Claims, 4 Drawing Figures

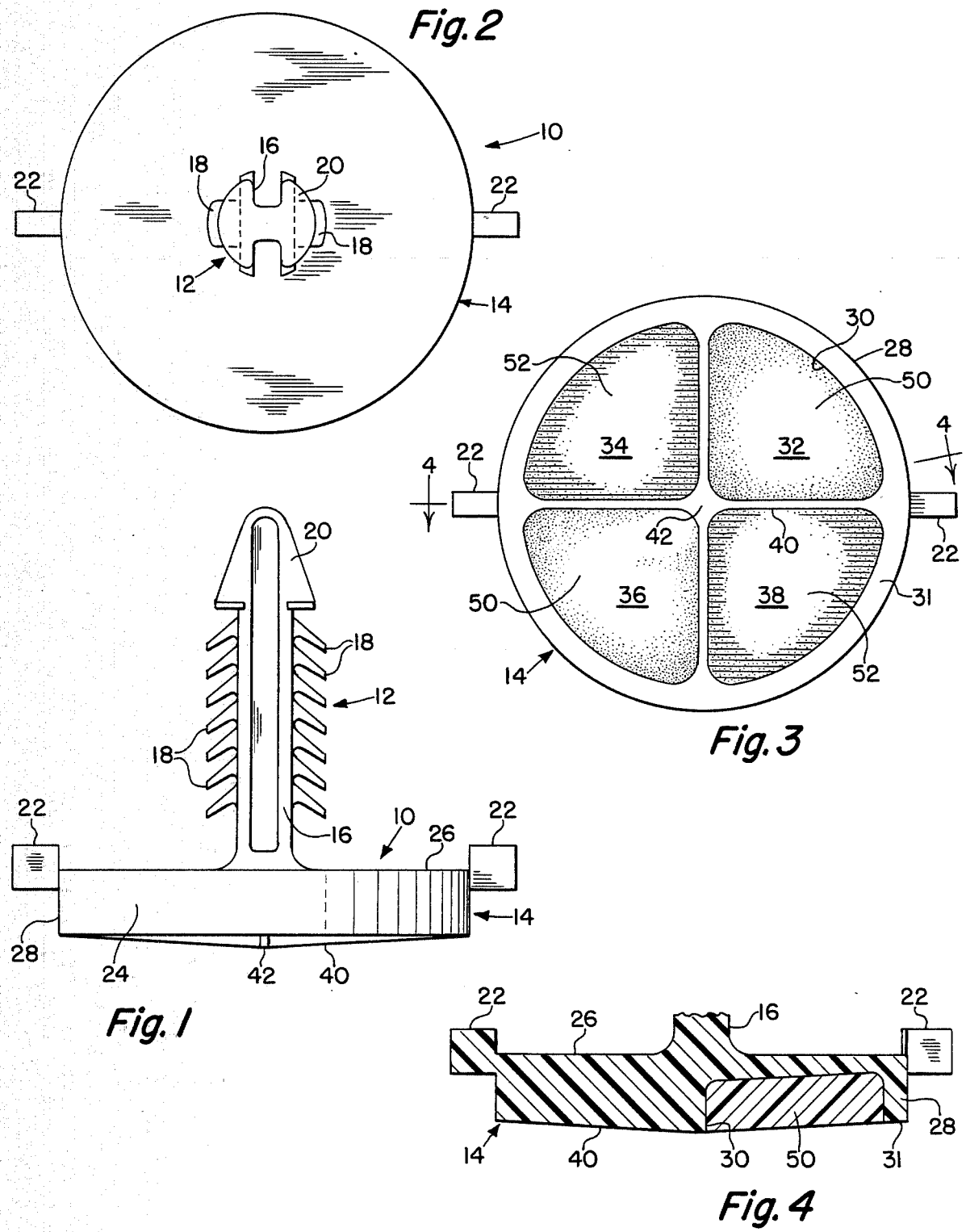

FRICTION WELDED FASTENER SYSTEM

BACKGROUND OF THE INVENTION

This invention relates to a system for attaching thermoplastic fasteners to a workpiece using a technique known as spin welding.

One of the shortcomings in spin welding thermoplastic fasteners is that they do not adequately adhere to all substrate surfaces. It is the object of this invention to provide bonding to such substrates by adding a heat activated adhesive layer to the base of the thermoplastic fastener, where the heat activated adhesive material is selected to have a good bonding affinity to both the thermoplastic fastener material and the substrate material.

A further object of this invention is to provide a two-part heat activated adhesive having its two parts physically separated on the base of the thermoplastic fastener. The two parts are mixed together as the thermoplastic fastener is driven to permit the curing agent and polymeric resin to coact into a good bonding adhesive.

Further objects and purposes of this invention will become clear upon a reading of the following detailed description in conjunction with the accompanying drawing.

DESCRIPTION OF THE DRAWING

For a better understanding of this invention, reference may be made to the accompanying drawing, in which:

FIG. 1 is a front elevational view of a fastener used in the system of the present invention; FIG. 2 is a top elevational view of the fastener depicted in FIG. 1;

FIG. 3 is a bottom elevational view of the fastener depicted in FIG. 1; and

FIG. 4 is a cross-sectional view taken along the line 4—4 of FIG. 3 and looking in the direction of the arrows.

DESCRIPTION OF PREFERRED EMBODIMENT

There is illustrated in FIGS. 1 through 4, a two-component fastener generally designated by the reference numeral 10. The two-component fastener 10 is constructed of two integrally formed fasteners. One of these fasteners is a push-in type fastener 12 and a friction welding fastener 14.

The push-in type fastener 12 forms no part of this invention and is depicted for illustrative purposes only. Push-in fastener 12 is of the type illustrated in U.S. Pat. No. 4,392,278 which issued to Peter R. Mugglestone and which is assigned to the same assignee as this invention. The fastener 12 has a shank 16 of an H-shaped cross section with a plurality of parallel spaced wings 18 integrally formed from the opposite plane surfaces of the shank 16. A tapered nose portion 20 is integrally formed on the outer end of the shank 16. The push-in fastener 12 is designed to be installed in an aperture such that the wings 18 resiliently engage the inner wall of the aperture to resist withdrawal of the fastener from the aperture.

The fastener 14 is generally known as the spin-welded type fastener. Fastener 14 is depicted with a pair of radially extending projections or ears 22.

The use of frangibly connected ears or projections 22 for driving a thermoplastic fastener base is the subject of U.S. Pat. No. 4,477,307, which issued to Cearlock et al. and is assigned to the same assignee as this invention.

The friction welding fastener 14 has a base member 24 molded of a thermoplastic material into a generally circular configuration. The base member 24 is constructed with a solid top wall 26 to which the shank 16 is integrally connected. An annular flange 28 is integrally formed with the outer edge of the top wall 26 to define a cavity 30 between the bottom surface 31 of flange 28 and top wall 26. Cavity 30 is divided into four equal compartments 32, 34, 36 and 38 by a cross-shaped membrane or thin wall 40 which is integrally connected to the interior of annular flange 28. Wall 40 is constructed of the same thermoplastic material as the base member 24 and has a thickness greater at its center 42 than at the connections to the annular flange 28 to provide an inwardly tapered thickness for each of the four wall segments for reasons to be explained hereinafter.

This invention grew out of the need for a spin welded fastener that will have good adhesion to substrate surfaces which do not have good bonding affinity to the thermoplastic material of base member 24. The concept of this invention is to insert into cavity 30 of base member 24 a heat activated adhesive material which is selected for having good bonding affinity for both the base material and the substrate material.

In the preferred embodiment of this invention, the heat activated adhesive is a two-part polymeric resin adhesive. Referring to FIG. 3, the uncured polymeric resin material 50 is contained in diagonally opposite pair of compartments 32 and 36, and the curing agent 52 is contained in the remaining two compartments 34 and 38. In other words, every other compartment would contain either an uncured polymeric resin material or a curing agent material. It is important that the chambers 32, 34, 36 and 38 be substantially filled so that the polymeric resin material and the curing agent will frictionally heat as the fastener 10 is spun.

A satisfactory tool for applying the friction welded fastener system embodying the principles of this invention is described in U.S. Pat. No. 4,477,307. When the fastener base member 14 is placed against the substrate, rotation of the fastener is commenced through the interaction of a peripheral protrusion on the tool engaging at least one of the frangible ears 22. Simultaneously, the tool applies axial pressure to the upper surface 26. This axial pressure applied to fastener 14 during rotation of the base member 24 creates friction between the lower surface 46 and the substrate. The frictional engagement generates heat at the lower surface 31.

Because the central web 42 is the thickest portion of the cross wall 40, the central web 42 makes the initial frictional contact with the substrate and causes heat to build up from the center of the lower surface 31 and across the adjacent areas of the polymeric resin and curing agent located in the four chambers 32, 34, 36 and 38. This heat causes the melting of the central web 42 and the intermixing of the two polymeric resin materials with the two chambers of the curing agent.

With continued rotation, the melting progresses gradually in a radial outward direction towards flange 28 causing increasing portions of the two resin chambers and two curing chambers to intermix. As the melting reaches flange 28, the heat substantially weakens the area holding the two frangible ears 22. This coupled with the increase in torque due to the melting across the interface of the fastener member and substrate cause the strength of the ears 22 to be weakened and break off. As a result, the rotational torque transmitting forces on the ears cease to drive the fastener. However, the tool is held in place a short time thereafter to permit the axial pressure between the fastener and the substrate to be maintained to ensure proper fusion therebetween.

An example of a two-part adhesive wwhich will successfully work using the spin welded technique described above for applying a nylon thermoplastic fastener to a glass-filled thermoset polyester resin substrate is a thermoset polyester resin mixed with isocyanate as its curing agent.

It will be appreciated from the foregoing description that a one-part heat activated adhesive could be inserted in the cavity of the base member 24. When using a one-part adhesive, it is unnecessary to include the partitioned wall 40. The one-part heat activated adhesive would fill the complete cavity 30 and would be thicker (dome-shaped) at the center of the cavity in the manner shown by the web 42 in FIG. 1 to ensure that the frictional heat build-up occurs at the center and gradually moves in an outward radial direction.

One successful use of a one-component heat activated adhesive is the combination of an epoxy resin and a polyamide latent catalyst. It has been found that this one-component heat-cured adhesive using the spin welding technique described above provides a very effective bond between a nylon thermoplastic fastener and a terpolymer elastomer substrate, such as E.P.D.M..

Another example of a one-component heat-cured adhesive is the Accuthane ® UR-1100 adhesive, which is a urethane prepolymer manufactured by H. B. Fuller Company. This adhesive is designed for bonding to substrates such as nylon, exposy 3MC, polyester 3MC, and metal.

Thus, by the proper selection of a heat activated adhesive material having a bonding affinity to a particular substrate material, it is possible to use the spin weld fastener system for securing a thermoplastic fastener to any type of substrate. It will be appreciated that it is within the spirit and scope of this invention that the ears 22 could be eliminated and the torque could be transmitted to the fastener by conventional means. In order to control the amount of fusion between the heat activated adhesive layer and the substrate, a timing mechanism could be incorporated into the tool which would automatically stop rotation of the fastener when a predetermined amount of fusion at the interface between the fastener and the substrate is achieved. This timing mechanism would necessarily be adjustable to accommodate the various adhesive materials, fastener configurations and conditions which would vary the curing time of the polymeric resin layer.

I claim:

1. A friction welding fastener system for fusing to a substrate by heat of friction induced by the application of rotative and axial forces applied to the fastener, comprising a base member of a thermoplastic material having an insufficient bonding affinity to said substrate to produce adequate adhesion between the bottom surface of said base and said substrate, a cavity formed inwardly of said bottom surface, an integral wall of thermoplastic material dividing said cavity into at least two compartments, a heat activated uncured polymeric resin material layer contained in one of said at least two compartments and a heat activated curing agent layer contained in the other of said at least two compartments, the thickness of said polymeric resin material layer and said curing agent layer being selected to permit contact with said substrate as said fastener is rotated, and means for driving said fastener to provide rotative and axial forces on said base to cause the melting of a portion of said integral wall sufficient to permit mixing of said polymeric resin material and said curing agent, the resulting cured polymeric resin being selected to have a bonding affinity for both said base member material and said substrate material.

2. A friction welding fastener system as defined in claim 1, wherein said thermoplastic material is nylon, said uncured polymeric resin material is a thermoset polyester resin and said curing agent is isocyanate.

3. A friction welding fastener system as defined in claim 1, wherein said integral wall has a cross-shaped configuration to divide said cavity into four compartments, said heat activated uncured polymeric resin material being contained in two diagonally opposite compartments and said curing agent material being contained in the other two compartments.

* * * * *